(12) United States Patent
Lin

(10) Patent No.: US 7,918,148 B2
(45) Date of Patent: Apr. 5, 2011

(54) WIRE STRIPPING KNIFE

(75) Inventor: Chong-Jiang Lin, Taichung (TW)

(73) Assignee: Nusharp Inc., Taichung (TW)

( * ) Notice: Subject to any disclaimer, the term of this patent is extended or adjusted under 35 U.S.C. 154(b) by 261 days.

(21) Appl. No.: 12/243,964

(22) Filed: Oct. 1, 2008

(65) Prior Publication Data

US 2009/0178515 A1 Jul. 16, 2009

(30) Foreign Application Priority Data

Jan. 11, 2008  (TW) ................................ 97101257 A

(51) Int. Cl.
*H02G 1/12* (2006.01)
*B26B 27/00* (2006.01)

(52) U.S. Cl. ............................................ 81/9.4; 30/90.6

(58) Field of Classification Search ...................... 81/9.4, 81/9.44, 9.41, 9.43, 77.31; 7/107, 118, 158; 30/90.6, 91.1, 91.2, 90.7

See application file for complete search history.

(56) References Cited

U.S. PATENT DOCUMENTS

| | | | | |
|---|---|---|---|---|
| 552,490 | A * | 12/1895 | Benecke | 30/90.9 |
| 2,674,796 | A * | 4/1954 | Herold | 30/262 |
| 4,451,948 | A * | 6/1984 | Goodrich et al. | 7/107 |
| 4,835,862 | A * | 6/1989 | Phillips | 30/90.1 |
| 5,435,029 | A * | 7/1995 | Carlson et al. | 7/107 |
| 5,732,471 | A * | 3/1998 | Korinek et al. | 30/90.6 |
| D403,568 | S * | 1/1999 | Liu | D8/105 |
| 6,351,865 | B1 * | 3/2002 | De Donato | 7/107 |
| 6,698,049 | B2 * | 3/2004 | McLoudrey | 7/158 |
| 7,225,490 | B1 * | 6/2007 | Yen | 7/107 |
| 2008/0271255 | A1 * | 11/2008 | Frazer | 7/107 |

* cited by examiner

*Primary Examiner* — David B Thomas

(57) ABSTRACT

A wire stripping knife comprises a handle having one end provided with a hanging portion to be hung to a desired position, and the other end fixed with a blade. The end of the handle, which is fixed with the blade, is pivoted with a clamping member. One end of the clamping member, which is adjacent to the blade, is provided with different-sized stripping notches. The handle and the clamping member each are provided with engaging portions for mutual engagement. The distal end of the blade is formed with a cutting surface vertical to the cutting edge for cooperating with a guiding plate at one end of the clamping member to strip off the insulation more quickly with high safety.

8 Claims, 6 Drawing Sheets

US 7,918,148 B2

WIRE STRIPPING KNIFE

BACKGROUND OF THE INVENTION

1. Field of the Invention

The present invention relates to a skinning knife and more particularly to a wire stripping knife for stripping insulation from a wire.

2. Description of the Prior Art

The existing skinning knifes or the wire stripping knifes on the market are normally designed to have a single handle provided with a blade, and the single blade of the skinning knife has an exposed cutting edge, which is likely to cut the user, thus causing much inconvenience.

A conventional wire stripping knife 90, as shown in FIG. 5, is provided at one end thereof with a grip end 91 to be griped by one hand of the user, and the other end of the stripping knife 90 is fixedly connected with a hook-shaped stripping blade 92, one end of which is provided for the user to cut the insulation of the wire along the axial direction of the wire. In order to avoid the occurrence of movement of the wire during the process of cutting, the user is required to grip the wire by the other hand, so that when cutting operation is performed, the cutting direction of the wire stripping knife 90 is toward the hand gripping the wire, thus causing unwanted injury, consequentially affecting the cutting stability. As known from the abovementioned, the above conventional structure lacks of operation safety and stability.

Therefore, in order to prevent the exposure of the blade, a blade case is farther engaged outside the blade when the blade is not in use, thus effectively avoiding cutting the user. However, once the blade is to be used, the blade case is still required to disengage from the blade. Since the blade case has a small volume, it is likely to be lost during storage, thus losing the protection function and still causing much inconvenience.

Hence, in order to prevent the blade case from being lost, the blade case is pivoted to the wire stripping knife, as shown in FIG. 6, the wire stripping knife 90' is provided at one end thereof with a grip end 91' to be gripped by one hand of the user, and the other end of the wire stripping knife 90' is fixedly connected with a hook-shaped stripping blade 92', a blade case 93 is further pivoted between the grip end 91' and the stripping blade 92'. The blade case 93 normally encloses the cutting edge of the stripping blade 92'. When in use, the blade case 93 is pivoted about the pivoting position to abut against the grip end 91', so that the user can further grip the grip end 91' and the blade case 93. However, in this case, the stripping blade 92' is in a complete exposure state, the wire stripping knife 90' is more likely to cut the fingers of the other hand gripping the wire of the user. It can be found that although this arrangement can avoid the loss of the blade case, it is still lack of safety and convenience, and the blade case has no functions other than preventing the user from being cut when the wire stripping knife is not in use.

The present invention has arisen to mitigate and/or obviate the afore-described disadvantages.

SUMMARY OF THE INVENTION

The primary objective of the present invention is to provide a wire stripping knife comprising a handle and a blade and a clamping member provided at a position where the handle is connected to the blade, and the clamping member is provided with plural different sized stripping notches opposite to the cutting edge of the blade for stripping the insulation of different sized electric wires or conductive wires, the handle and the clamping member are each provided with an engaging means for mutual engagement, the blade is additionally provided with a cutting surface vertical to the cutting edge that is within the scope of the clamping member, the clamping member is further provided at a distal end thereof with a guiding plate, which can be pre-inserted between the insulation and the core of the electric wire and then guide the cutting surface to cut open the insulation of the electric wire, thus achieving the objective of stripping off the insulation quickly and safely, and the clamping member can be provided for insertion of one of fingers of the user to achieve the objective of convenient to use.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
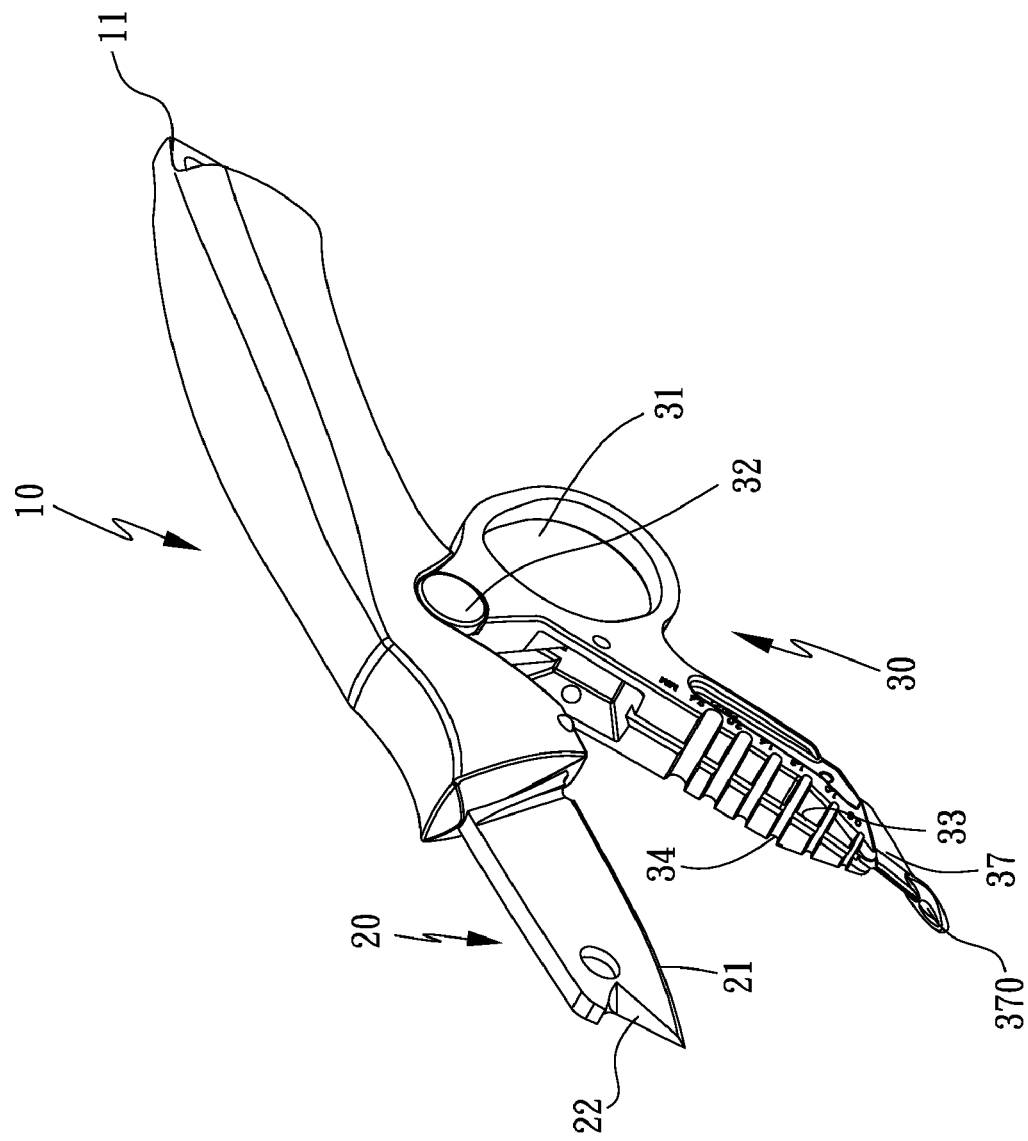
FIG. 1 is a perspective view of a wire stripping knife in accordance with the present invention.
Figure 2:
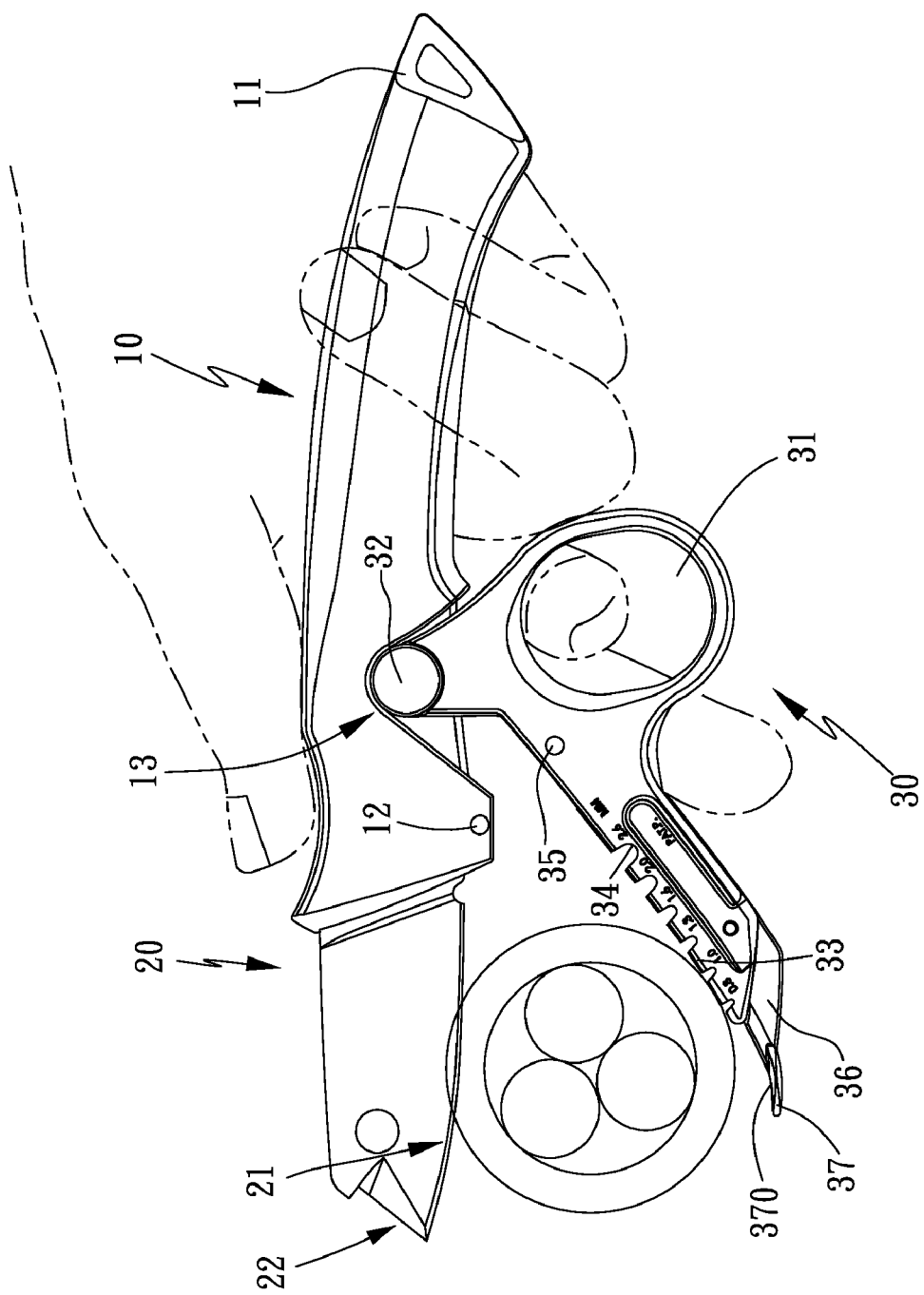
FIG. 2 is a side view illustrating an opening state of a clamping member relative to a blade in accordance with the present invention.

Referring to FIGS. 1-2, a wire stripping knife in accordance with the present invention includes a handle 10 with a blade 20, a clamping member 30 at one side of the blade 20. With the cooperation of the handle 10 and the clamping member 30, the safety of the wire stripping knife is correspondingly improved, and the insulation of the electric wire or conductive wire can be stripped off more conveniently and quickly.

The handle 10 is in the form of an elongated arc-shaped block and provided at one end thereof with a triangular hanging portion 11 to be hung to a desired position. The handle 10 is provided at the other end thereof with the blade 20, and at each of two opposite sides thereof with an engaging protrusion 12 adjacent to the blade 20 to be engaged to the clamping member 30. In addition, the handle 10 is provided with a pivoting portion 13 adjacent to the engaging protrusions 12 for pivotal connection with the clamping member 30.

The blade 20 is in the form of a trapezoidal plate and includes an arc-shaped cutting edge 21 to be used by the user to strip off the insulation of the electric wire or conductive wire. In addition, the blade 20 is provided at a free end thereof with a guiding inclined cutting surface 22 that is vertical to the cutting edge 21 for cooperating with the cutting edge 21 to strip off the insulation of the electric wire.

The clamping member 30 is in the form of an English letter "P" and provided with a transversal inserting portion 31 for insertion of one of the fingers of the user such as the middle finger to control the angle of the cutting edge 21 relative to the clamping member 30, so as to facilitate insertion of the electric wire. As shown in FIGS. 1 and 2, one end of the clamping member 30 is assembled to the handle via the pivoting portion 32 in the form of a rivet, and the clamping member 30 is additionally provided with a holding groove 33 extending to the pivoting portion 32 and in alignment with the cutting edge 21 of blade 20 and provided with plural different sized spaced-apart U-shaped stripping notches 34 on the holding groove 33. The clamping member 30 is further provided with an engaging hole 35 to be engaged to the engaging protrusions 12. The clamping member 30 has a distal end that is far away from the pivoting portion 32 and fixed with a short guiding plate 36 made of metal material with high hardness. The tip end of the guiding plate 36 slightly extends beyond the cutting surface 22 and is formed with a guiding block 37 in the form of an elliptical skateboard. The guiding block 37 is provided with a tip protecting portion 370 in the form of a holding groove in alignment with the tip end of the blade 20 where the cutting edge 21 is joined with the cutting surface 22, so that when the clamping member 30 moves toward the blade 20, the tip end of the blade 20 can directly enter the tip protecting portion 370 for avoiding being damaged by external force or cutting other objects.

Figure 4:
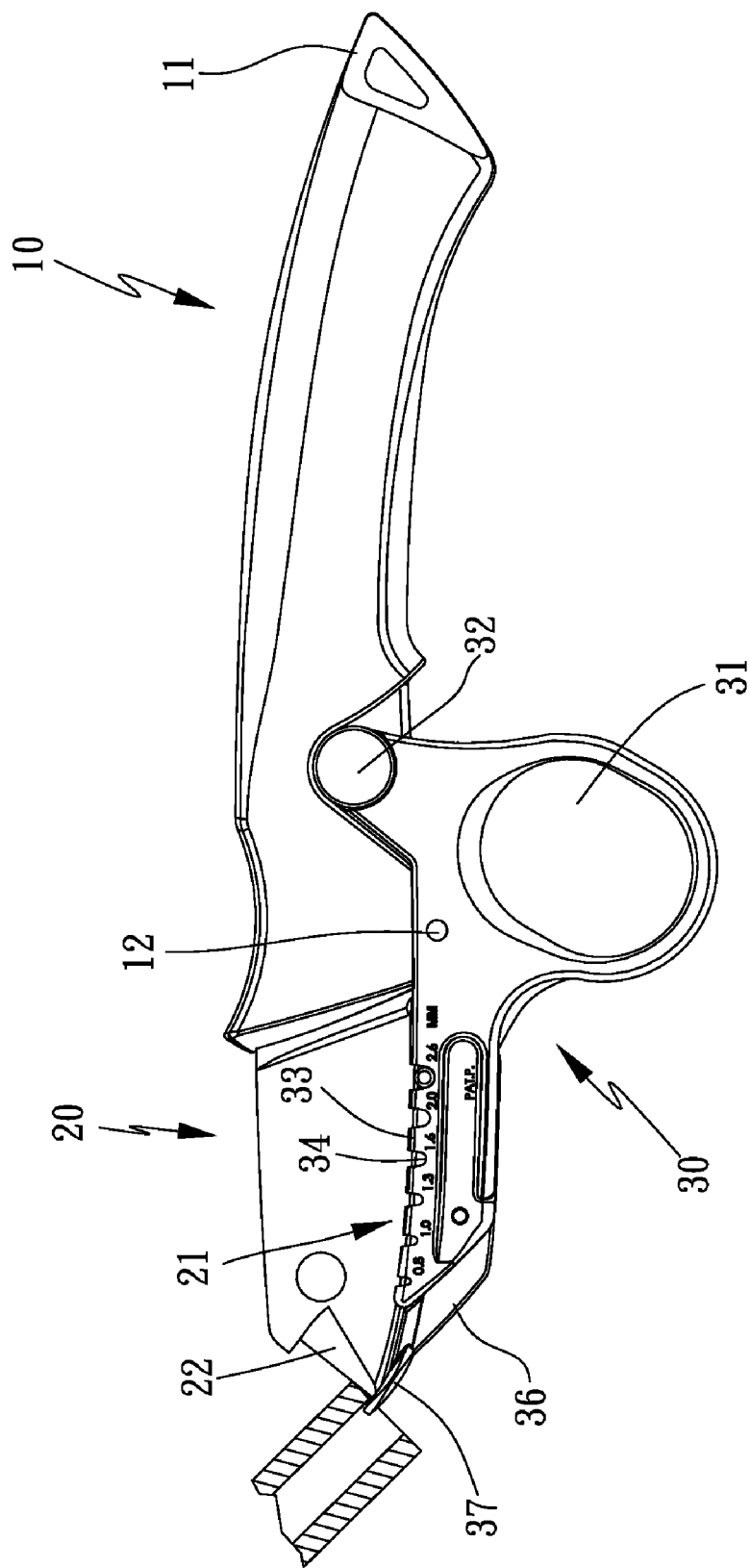
FIG. 4 is an operational view illustrating how the wire stripping knife in accordance with the present invention cutting open wire insulation in a push manner.
Figure 5:
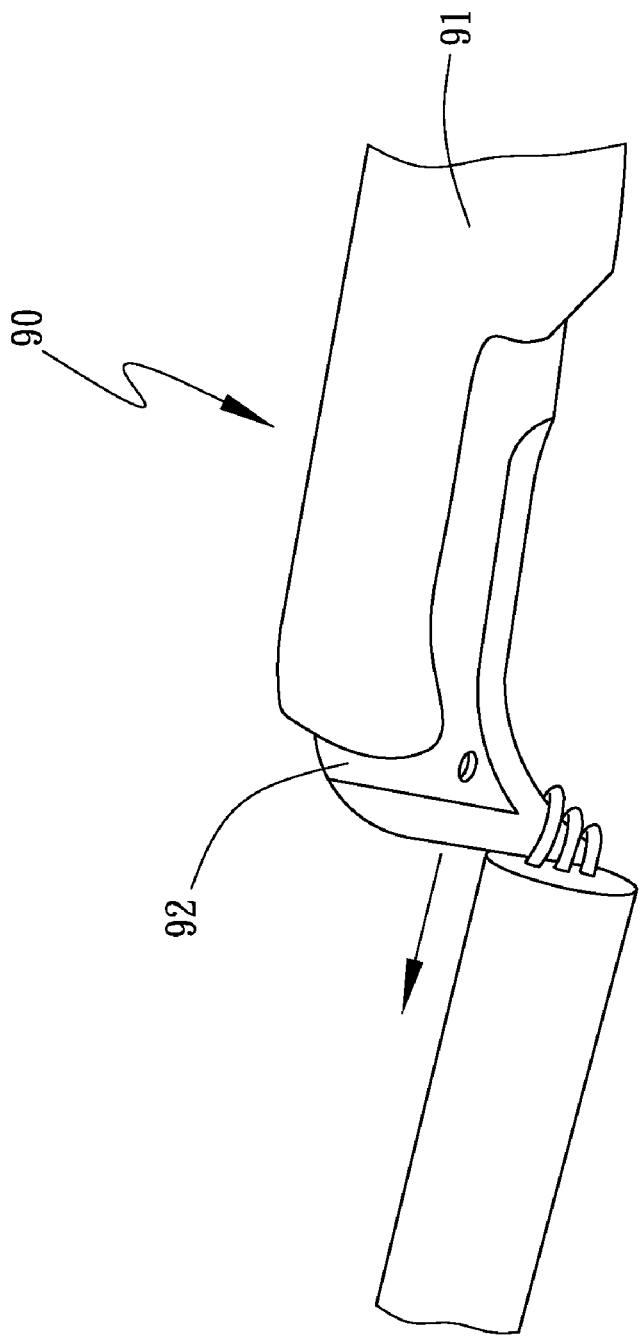
FIG. 5 is an operation view of a conventional wire stripping knife.
Figure 6:
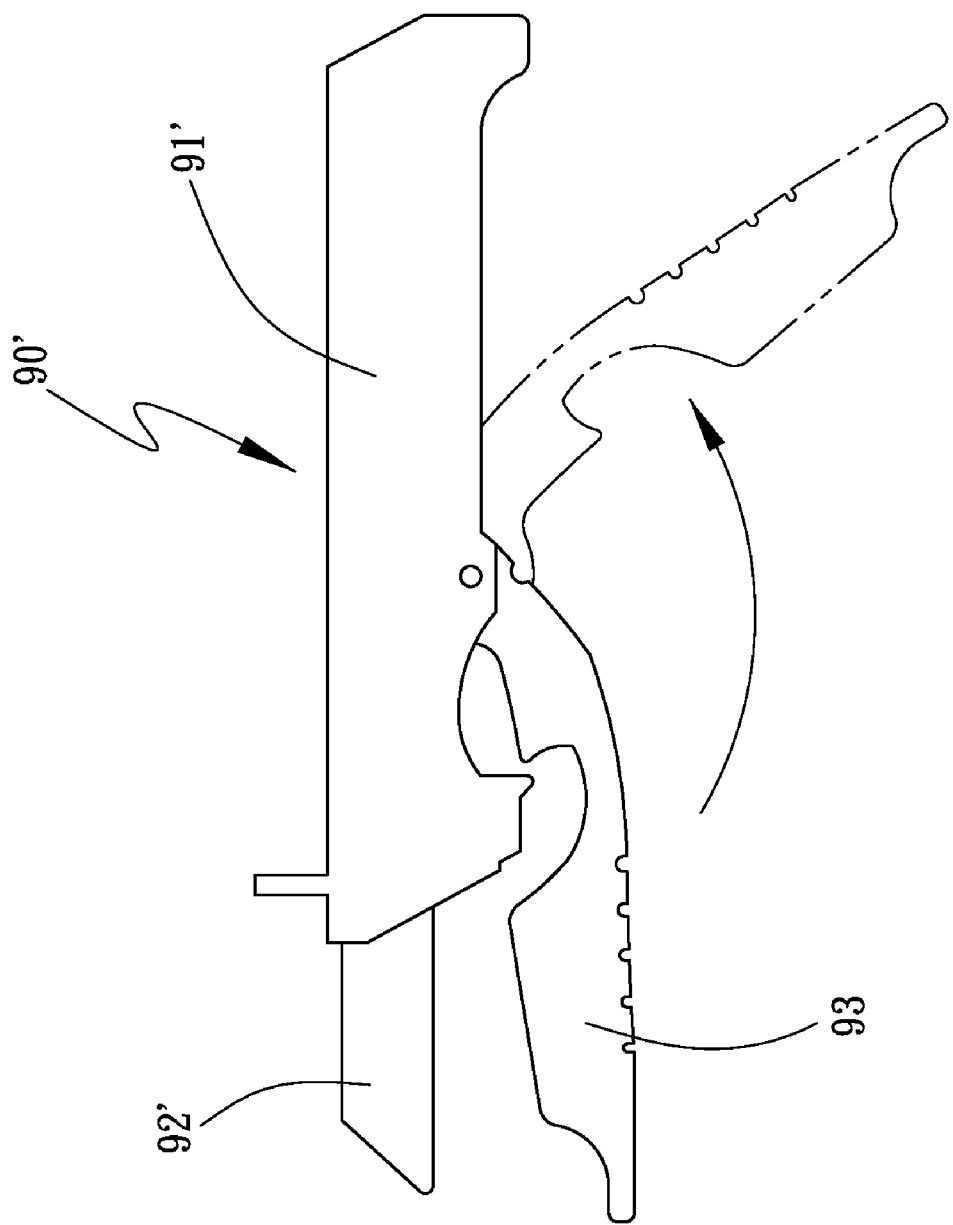
FIG. 6 is a schematic view of a conventional wire stripping knife with a blade case.

When in use, as shown in FIG. 4, the electric wire with a size coincident with one of the stripping notches 34 can be placed in the corresponding stripping notch 34 when the clamping member 30 is opened. While being clamped, the electric wire is rotated therein, so that the insulation of the electric wire can be transversely cut and then pulled off along the axial direction of the electric wire, thus stripping off the insulation of the electric wire. As for the electric wire with a certain specification corresponding to the notches 34, the arrangement of the stripping notches 34 makes the stripping operation more quick and convenient.

If the outer diameter of the electric wire is greater than the respective stripping notches 34, as shown in FIG. 2, the electric wire can be placed between the cuffing surface 22 of the blade 20 and the clamping member 30, and the user grips the handle 10 with the middle finger being held in the inserting portion 31 of the clamping member 30, so that the user can press the exterior of the inserting portion 31 and the holding groove 33 of the clamping member 30 to close the holding groove 33 and the stripping notches 34 of the clamping member 30 toward the cutting edge 21 of the blade 20 in such a manner the cutting edge 21 of the blade 20 and the clamping member 30 can clamp the electric wire. In this case, the insulation of the electric wire can be cut through the rotation of the electric wire between the blade 20 and the clamping member 30, and then the user can directly draw one end of the electric wire to strip off the insulation of the electric wire easily.

Figure 3:
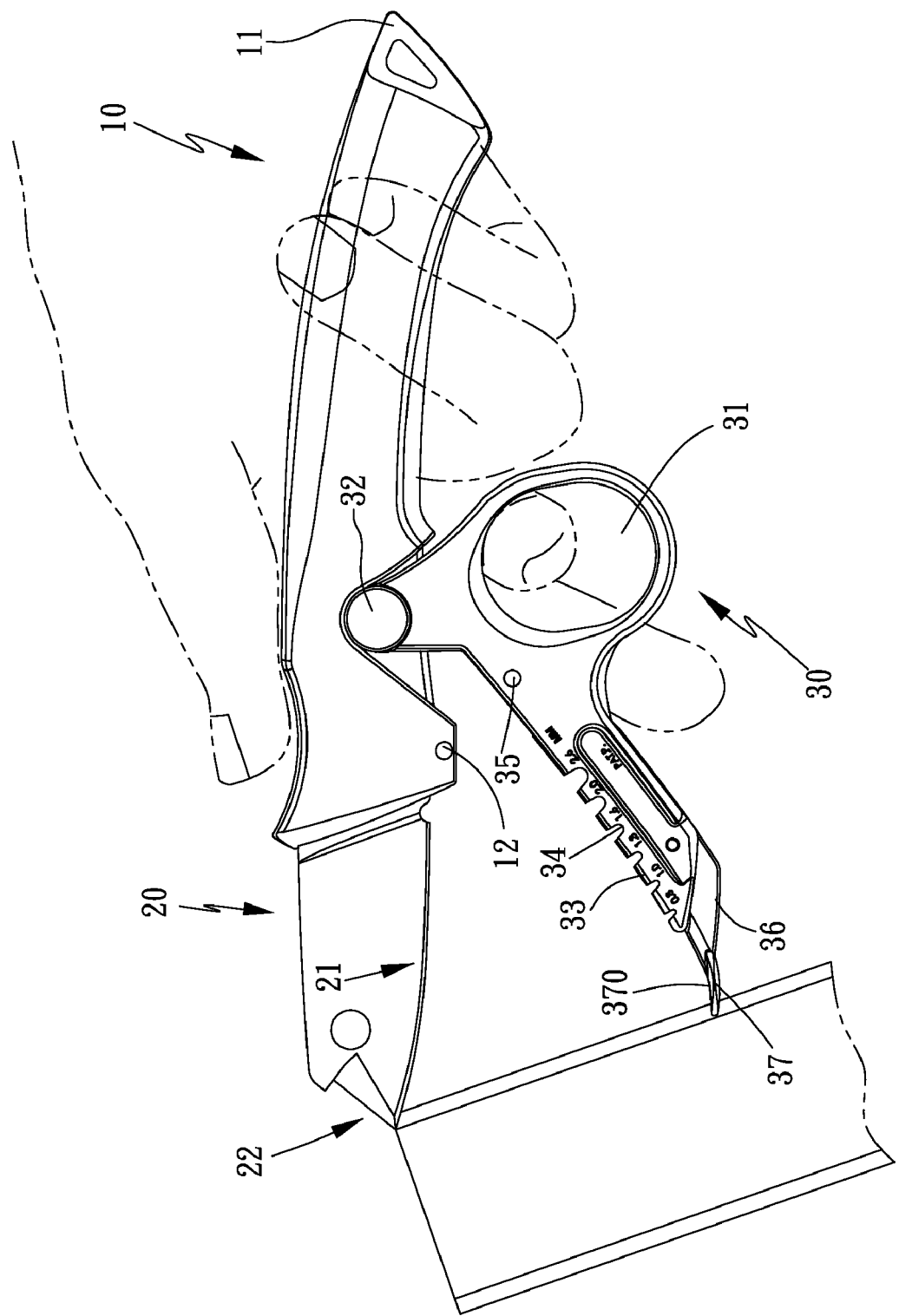
FIG. 3 is an operational view illustrating how the wire stripping knife in accordance with the present invention cut a predetermined length.

Further referring to FIG. 3, if the cutting edge 21 of the blade 20 strips off a relatively long insulation, the clamping member 30 will be opened with respect to the cutting edge 21 of the blade 20 to locate the tip end of the cutting edge 21 of the blade 20 on the insulation of one end of the electric wire and fix the tip end of the clamping member 30 at a predetermined length from the tip end of the cutting edge 21 on the insulation of the electric wire. In this case, if the thumb of the user presses against the blade 20 to move the blade 20 toward the clamping member 30, the cutting edge 21 can substantially cut out a slit with the predetermined length. After that, through the process of making a cut around the insulation of electric wire at the distal end of the slit, the predetermined length of wire insulation can be cut down quickly and conveniently with high safety. Obviously, the wire stripping knife can substantially strip off a predetermined length of insulation from the electric wire and can further help the user to strip off the relatively thick wire insulation.

In addition, as shown in FIG. 4, the cutting surface 22 of the blade 20 can cooperate with the guiding plate 36 to perform a safety push cutting operation. The tip end of the guiding block 37 of the guiding plate 36 is inserted between the inner periphery of the insulation of the electric wire and the core of the electric wire, and the cutting surface 22 of the blade 20 abuts against the end surface of the insulation of the electric wire, so as to perform a cutting operation along the axial direction of the electric wire, thus cutting open the wire insulation quickly and conveniently in a push manner. It can be found that the insulation of the electric wire or conductive wire can be substantially cut without cutting the hand of the user.

The above structure can offer the following advantages such as:

1. Multiple functions: the design of the cutting edge 21 and the cutting surface 22 of the blade 20 and the stripping notches 34 and the guiding plate 36 of the clamping member 30 can help the user to cut the insulation of the electric wire from different directions, thus providing multiple functions.

2. Fast and convenient: according to different sized electric wires, they can be placed inside or outside the stripping notches 34 to be subjected to a ring cutting operation, with the design of the cutting surface 22 and the guiding plate 36 and the opening and closing operations of the clamping member 30 and the blade 20, the insulation of the electric wire can be subjected to the axial cutting operation, so that the wire stripping knife in accordance with the present invention can offer different cutting modes to satisfy different requirements, and the cutting operation is fast and convenient.

3. Quick auxiliary operation: when the wire stripping knife is not used for the moment, the wire stripping knife can rotate around the middle finger to release the thumb and the forefinger until it is located on the back of the handle, at this moment, the thumb and the forefinger can wind two cored wires together without laying the wire stripping knife down, in this case, when the wire stripping knife is to be used, it can be directly rotated for next usage quickly and conveniently.

4. convenient to carry: the hollow hanging portion 11 of the handle 10 can be locked on a locking structure on the body of the user, so that the wire stripping knife in accordance with the present invention is convenient for the user to carry.

While we have shown and described various embodiments in accordance with the present invention, it is clear to those skilled in the art that further embodiments may be made without departing from the scope of the present invention.

What is claimed is:

1. A wire stripping knife comprising:
   a handle being provided with a hanging portion in the form of a hole at one end thereof for hanging the handle to a desired position;
   a blade having one end fixed at the other end of the handle, a cutting edge on one side thereof and the other end formed with a cutting surface adjacent to the cutting edge; and
   a clamping member having one end pivoted to the handle and the other end extending toward the cutting edge, the clamping member being provided with an inserting portion for insertion of user's finger so as to enable user to hold the clamping member stably while doing wire stripping.

2. The wire stripping knife as claimed in claim 1, wherein the handle is provided at each of two opposite sides thereof with an engaging protrusion adjacent to the blade, the clamping member is provided with an engaging hole to be engaged with the engaging protrusions of the handle, the handle is further provided with a pivoting portion adjacent to the engaging protrusions thereof for pivotal connection with the clamping member.

3. The wire stripping knife as claimed in claim 2, wherein the clamping member is fixed with a guiding plate at the other end thereof, the guiding plate has one end extending beyond the blade, which is provided with a guiding block, the guiding block is provided with a tip protecting portion.

4. The wire stripping knife as claimed in claim 1, wherein the clamping member is provided with a holding groove extending to the pivoting portion thereof and in alignment with the cutting edge of the blade, the holding groove is provided with plural different sized spaced-apart U-shaped stripping notches opposite to the cutting edge of the blade.

5. A wire stripping knife comprising:
a handle being provided with a hanging portion at one end thereof;
a blade having one end fixed at the other end of the handle, a cutting edge on one side thereof and the other end formed with a cutting surface adjacent to the cutting edge; and
a clamping member having one end pivoted to a position where the blade is assembled to the handle and being provided with a guiding plate at a free end thereof, one end of the guiding plate, which extends beyond the blade, is provided with a guiding block which is provided with a tip protecting portion for receiving and protecting a tip end of the blade.

6. The wire stripping knife as claimed in claim 5, wherein the handle is provided at each of two opposite sides thereof with an engaging protrusion adjacent to the blade, the clamping member is provided with an engaging hole to be engaged with the engaging protrusions of the handle.

7. The wire stripping knife as claimed in claim 5, wherein the clamping member is provided with an inserting portion for insertion of one of fingers.

8. The wire stripping knife as claimed in claim 5, wherein the clamping member is provided with a holding groove extending to the pivoting portion thereof and in alignment with the cutting edge of the blade, the holding groove is provided with plural different sized spaced-apart U-shaped stripping notches opposite to the cutting edge of the blade.

* * * * *